DRIVE MEMBER IN POWER-DRIVEN TYPEWRITERS
Filed April 6, 1966 2 Sheets-Sheet 1
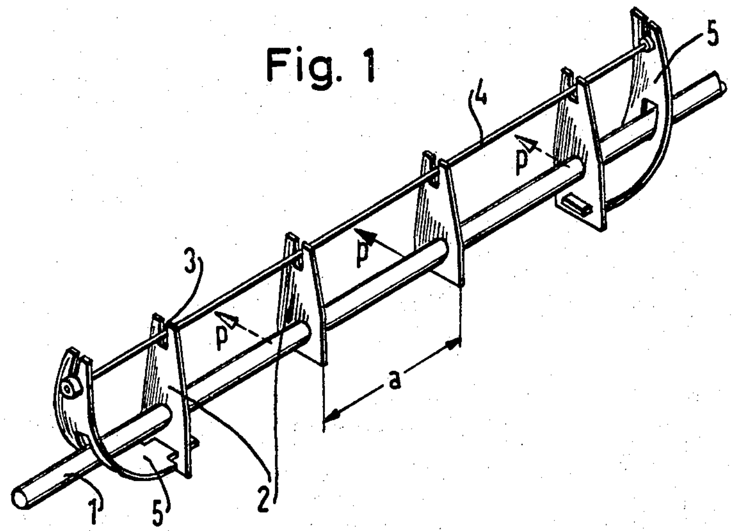
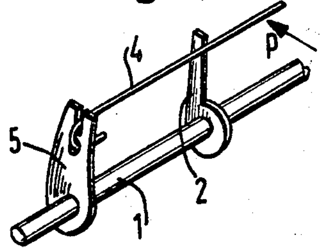
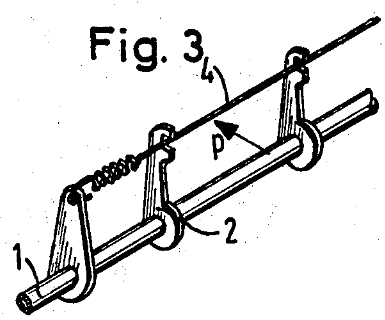
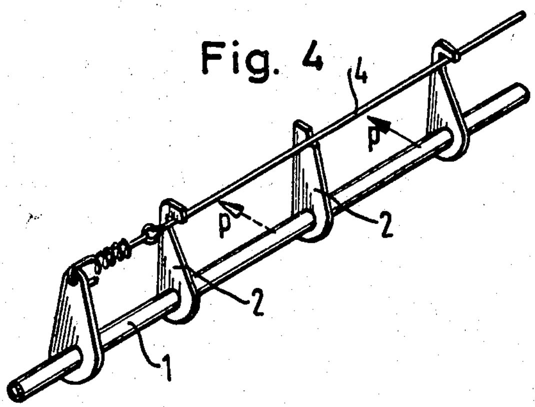
INVENTORS
HORST STAHL
RUDOLF REKEWITZ
BRUNO NITSCHKE
WERNER WESTRAM
BY Spiel & Spiel ATTORNEYS INVENTORS
HORST STAHL
RUDOLF REKEWITZ
BRUNO NITSCHKE
WERNER WESTRAM
BY Spiece & Spiece ATTORNEYS United States Patent Office 3,383,942
Patented May 21, 1968

1

3,383,942
DRIVE MEMBER IN POWER-DRIVEN TYPEWRITERS

Horst Stahl, Rudolf Rekewitz, Bruno Nitschke, and Werner Westram, Munich, Germany, assignors to Siemens Aktiengesellschaft, Berlin, Germany, a corporation of Germany Filed Apr. 6, 1966, Ser. No. 540,635
Claims priority, application Germany, Apr. 13, 1965, S 96,529
9 Claims. (Cl. 74—519)

The invention relates to a drive member in power driven typewriters, particularly in teletype machines, for the acceleration of function members.

For the transmission of mechanical movements from a point arbitrarily selectable over the whole width of the machine to a fixedly disposed drive point or vice versa there are utilized pivotal flap-like operating members. Such movements are utilized for release, drive transmission or position comparisons. The torque to be transmitted requires, in the presence of great axial spacing between primary drive and secondary drive elements, a sufficient torsional rigidity of the operating member to prevent losses in the travel or stroke of the drive member. For the reduction of the operating forces and undesired impact rebounds, there is particularly sought to be achieved a small mass moment of inertia of the operating member.

The forms of construction of the known operating members, and in particular of the operating members in use, disclose that, depending on the purpose and number of parts of the individual actuating members, a compromise solution was employed in the design, the initial considerations being to provide simple manufacture, and the achievement of a rigidity to bending as high as possible.

Proceeding from the two concepts referred to over a long period sufficiently satisfactory results were achieved as long as the demands made on the operating speeds were not extremely high.

However, the greater the increase in operating velocity, the greater the consideration which must be given to the design of all movable parts, particularly with respect to the inertia moments in the actuating member extending in the direction of movement thereof, as high dynamic forces must be applied to overcome considerable inertia moments which otherwise may exist, whereby interfering rebounds of the cooperating elements involved are created. As a consequence of such rebounds defective cooperation of the individual elements and increased operational noises occur.

The problem of the invention is the production of an actuating member in power-driven typewriters, whose torsional rigidity is very high and coupled with as low as possible moments of inertia in the operating direction. Moreover, a low production expenditure is to be achieved.

According to the invention an actuating member which fulfills the requirements set forth may comprise pivotally swingable crosspieces, rigidly secured on, and thus nonrotatably carried by an operating shaft is constructed with high rigidity in the pivotal direction, with the free ends of the crosspieces supporting a band or strip, constructed to resist bending in its functional direction, which acts on selected functional parts.

According to a preferred construction of the drive member, a wire cord tensioned by spring elements is supported on the free ends of the crosspieces nonrotatably carried on the shaft, so that they oppose the sagging or bending of the wire cord in the pivotal direction.

According to another preferred construction of the operating member according to the invention, a steel band or strip with high rigidity to bending is disposed on the free ends of the crosspieces. This arrangement produces an operating member in which the moments of inertia in operating direction are kept extremely small, along with the achievement of as high as possible a torsional and bending rigidity. Moreover, by the use of commercial band steel, a special treatment of the actuating edge is eliminated.

The steel band is preferably retained in the free ends of the crosspieces by the clamping action of sheared-out tabs which are pressed back into their original positions. This manner of securing the steel band is extremely simple and, moreover, has the advantage that the steel band is tensioned in the attachment by the pressing back of the sheared-out tabs and thereby held in such tensioned position.

Details of the invention are hereafter described with the aid of examples of construction illustrated in the drawing, in which:

FIG. 1 illustrates an operating member in which a wire cord, tensioned by spring elements, is operatively supported by the free ends of the crosspieces;

FIGS. 2, 3 and 4 illustrate additional arrangements for securement of the wire cord to the crosspieces.

Referring to FIG. 1, arranged on the shaft at fixed distances apart are thin crosspieces 2, which are rotatively stationary on the shaft. Slots 3 in the free ends of the crosspieces 2 serve for the guidance of a wire 4. At the two ends of the operating member there are arranged resilient spring elements 5, which tension the wire 4 in axial direction. This biasing reduces deflection or bending of the wire 4 under the action of a force P. The torsional rigidity of the member necessary for the transmission of a desired torque is determined by the torsional rigidity of the shaft 1, while the extent of the intervals between the individual crosspieces 2 is governed according to load and the thickness of wire 4.

FIGS. 2, 3 and 4 illustrate further possibilities for the guiding and tensioning of the wire 4 and the reduction of the moment of inertia through corresponding shaping and arrangement of the crosspieces 2 and the spring elements 5.

Figure 5:
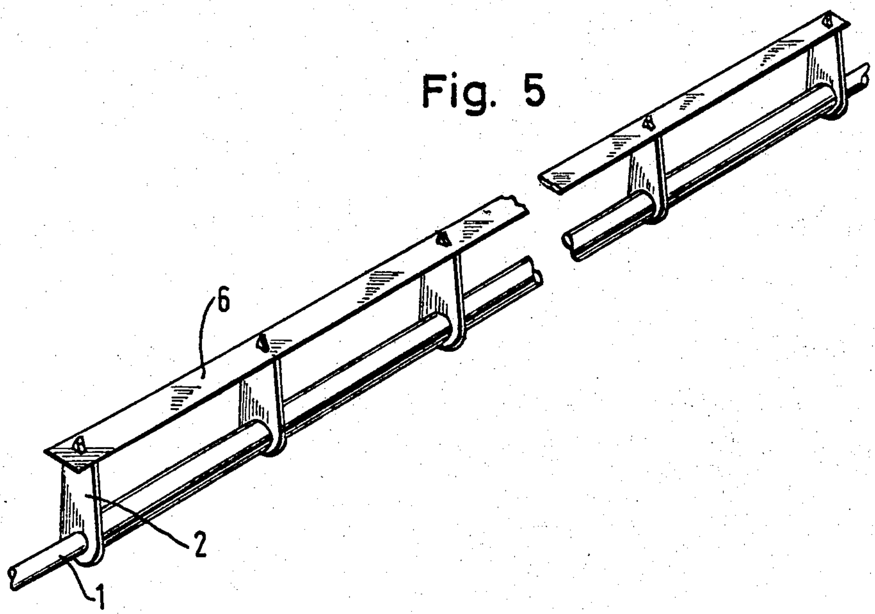
FIGS. 5 and 6 each illustrate an operating member employing a steel band or tape, arranged on the free ends of the crosspieces, with great rigidity to bending in its direction of movement.

In the construction of FIG. 5 the free ends of the crosspieces 2, securely fixed against rotation on the shaft 1, extend through openings in a steel band 6 and are twisted therebehind, so that the steel band 6 is securely retained in position. As compared to a wire cord, the steel band 6 has, in the operating direction, a very high rigidity to deflection, so that with equal length of the actuating member a smaller number of crosspieces 2 suffice.

Figure 6:
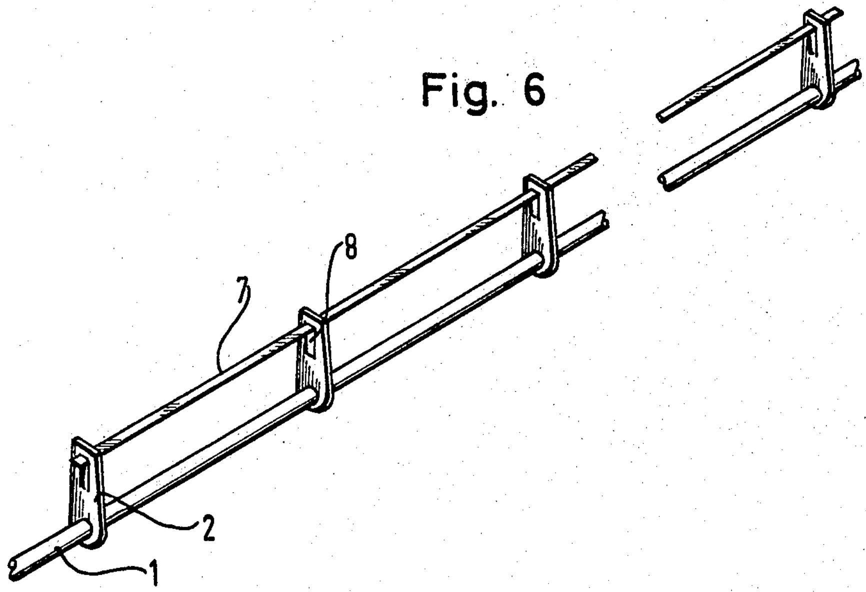

FIG. 6 likewise illustrates an actuating member in which the crosspieces 2 are rigidly mounted on the shaft 1, and thus nonrotatable relative thereto, the free ends of the crosspieces having openings therein through which extends a steel strip 7. The attachment of such steel strip 7 to the ends of the crosspieces 2 is accomplished by threading the steel strip through openings in the free ends of the crosspieces which are formed by shearing out tabs 8 from the body of the crosspiece, with the sheared-out tabs being then pressed back into their original position to securely clamp the steel strip. With such clamping connection there may be simultaneously achieved a tensioning of the strip 7.

Depending on structural length and load of the actuating member, it is possible to support the shaft 1, which may have, as desired, a bar or tubular cross section, by a suitable number of uniformly distributed supporting bearings, whereby axial vibrations are avoided.

The actuating member according to the invention may be utilized as a releasing member in a keyboard structure or as an actuating member for the releasing of control functions.

Changes may be made within the scope and spirit of the appended claims which define what is believed to be new and desired to have protected by Letters Patent.

We claim:

1. A drive member for power driven typewriter, particularly in teletype machines, for the acceleration of actuating members, comprising a shaft, supported for pivotal movement, a plurality of transversely extending cross members carried by and pivotal with said shaft and having a high rigidity to deflection in the pivotal direction, and an elongated member extending between the respective cross members adjacent the free ends thereof and forming the operating member for engagement with members to be actuated for the acceleration thereof, said elongated member being arranged to provide a high resistance to deflection in the direction of its actuating movement.

2. A drive member according to claim 1, wherein said elongated member comprises a wire-like element, and means operatively carried by said shaft for tensioning said element, said cross members being operative to restrict movement of said element in the direction of its actuating movement.

3. A drive member according to claim 2, comprising in further combination, means for tensioning said wire-like element in a direction parallel to the axis of said shaft.

4. A drive member according to claim 3, wherein said tensioning means comprises a pair of resilient cross members formed from sheet-like stock and operatively carried by said shaft, said resilient cross members forming anchoring means for the respective ends of said wire-like element.

5. A drive member according to claim 3, wherein said tensioning means comprises a coiled tension spring anchored at one end to a cross member and connected at the other end to the adjacent end of said wire-like element.

6. A drive member according to claim 5, wherein said spring is formed from the material of and integrally connected with said wire-like element.

7. A drive member according to claim 1, wherein said elongated member comprises a metal strip having a greater width in the direction of its actuating movement than the thickness thereof in the transverse direction, to provide the greatest resistance to deflection in the direction of its actuating movement.

8. A drive member according to claim 7, wherein said strip is attached to the free ends of the cross members by tabs formed from the respective cross members and engaging the adjacent portions of the strip in clamping relation.

9. A drive member according to claim 7, wherein said strip is provided with openings therein through which the free end portions of the cross members extend.

References Cited

UNITED STATES PATENTS

| | | | |
|---|---|---|---|
| 2,144,807 | 1/1939 | Norton | 74—519 |
| 2,337,513 | 12/1943 | Watson | 74—519 |

FRED C. MATTERN, Jr., *Primary Examiner.*

F. D. SHOEMAKER, *Assistant Examiner.*